US012240192B2

(12) United States Patent
Schrempf et al.

(10) Patent No.: US 12,240,192 B2
(45) Date of Patent: Mar. 4, 2025

(54) CO-MOLDING OF NON-CRIMPED FABRIC AND SMC

(71) Applicant: Magna Exteriors Inc., Concord (CA)

(72) Inventors: Rudolph A. Schrempf, Brampton (CA); Ranjit Pachha, Brampton (CA); Matthew Homen, North York (CA); Ian M. Byberg, Williamstown (CA)

(73) Assignee: Magna Exteriors Inc., Aurora (CA)

( * ) Notice: Subject to any disclaimer, the term of this patent is extended or adjusted under 35 U.S.C. 154(b) by 412 days.

(21) Appl. No.: 17/147,803

(22) Filed: Jan. 13, 2021

(65) Prior Publication Data

US 2021/0213692 A1 Jul. 15, 2021

Related U.S. Application Data

(60) Provisional application No. 62/960,568, filed on Jan. 13, 2020.

(51) Int. Cl.
*B29C 70/86* (2006.01)
*B29B 11/14* (2006.01)
(Continued)

(52) U.S. Cl.
CPC ............ *B29C 70/865* (2013.01); *B29B 11/14* (2013.01); *B29C 43/18* (2013.01); *B29C 70/683* (2013.01);
(Continued)

(58) Field of Classification Search
CPC ..... B29C 70/865; B29C 70/683; B29C 43/18; B29B 11/14
See application file for complete search history.

(56) References Cited

U.S. PATENT DOCUMENTS

| 2008/0044506 A1* | 2/2008 | Zahlen | B29C 70/548 |
| | | | 425/130 |
| 2011/0150661 A1* | 6/2011 | Robbins | B32B 27/36 |
| | | | 428/221 |

(Continued)

FOREIGN PATENT DOCUMENTS

| EP | 0687548 A2 | 12/1995 |
| EP | 2508326 A1 | 10/2012 |

(Continued)

OTHER PUBLICATIONS

European Search Report for Application No. EP21151305 dated Jun. 3, 2021 (1-page).

*Primary Examiner* — Michael A Tolin
*Assistant Examiner* — Hana C Page
(74) *Attorney, Agent, or Firm* — Warn Partners, P.C.

(57) ABSTRACT

Co-molding of non-crimped fabric and sheet molding composition. The pre-preg of non-crimped fabric is dried to achieve suitable stiffness for molding. The pre-preg allows the pre-formed non-crimped fabric feature to retain its shape during molding. A plurality of thorns is provided in the molding tooling to further prevent movement of pre-preg during molding. The method of co-molding includes, drying of the pre-preg to achieve suitable stiffness for molding, pre-forming of the pre-preg, and incorporating a plurality of stand-off features or thorns in the molding tool to prevent movement of pre-preg during co-molding so that predetermined full coverage of non-crimped fabric is maintained in predetermined area(s) of the molded part and the continuous fibers of the non-crimped fabric are not distorted.

14 Claims, 8 Drawing Sheets

(51) Int. Cl.
- *B29C 43/18* (2006.01)
- *B29C 70/68* (2006.01)
- *B29K 105/08* (2006.01)
- *B29K 707/04* (2006.01)
- *B29L 31/30* (2006.01)
- *B62D 29/04* (2006.01)

(52) U.S. Cl.
CPC ........... *B29K 2105/0863* (2013.01); *B29K 2105/089* (2013.01); *B29K 2707/04* (2013.01); *B29L 2031/30* (2013.01); *B62D 29/043* (2013.01)

(56) References Cited

U.S. PATENT DOCUMENTS

| | | | |
|---|---|---|---|
| 2012/0309248 A1* | 12/2012 | Wockatz | B32B 5/26 442/327 |
| 2013/0174969 A1* | 7/2013 | Karb | B29B 11/16 156/196 |
| 2016/0101575 A1 | 4/2016 | Ashtari et al. | |

FOREIGN PATENT DOCUMENTS

| | | |
|---|---|---|
| EP | 2918404 A1 | 9/2015 |
| JP | H06155483 A | 6/1994 |

\* cited by examiner

FIG. 1
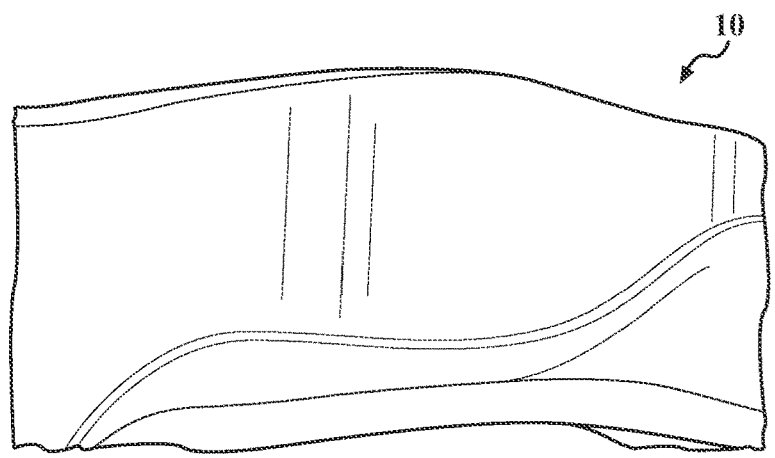
FIG. 2
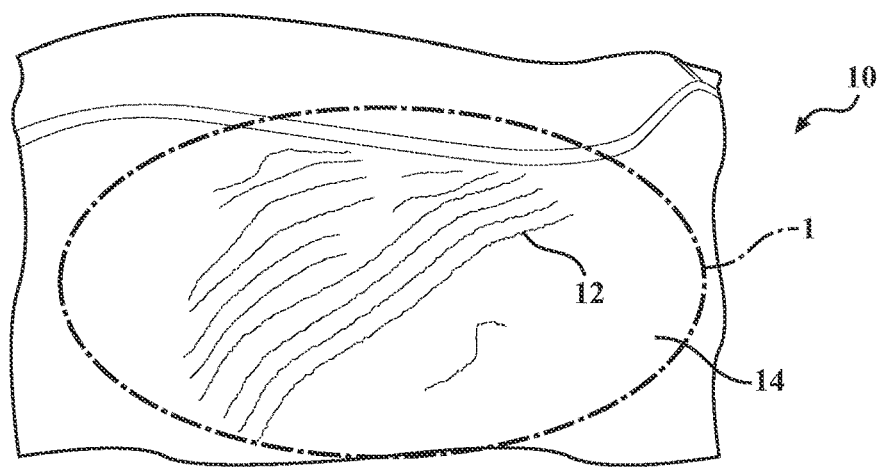
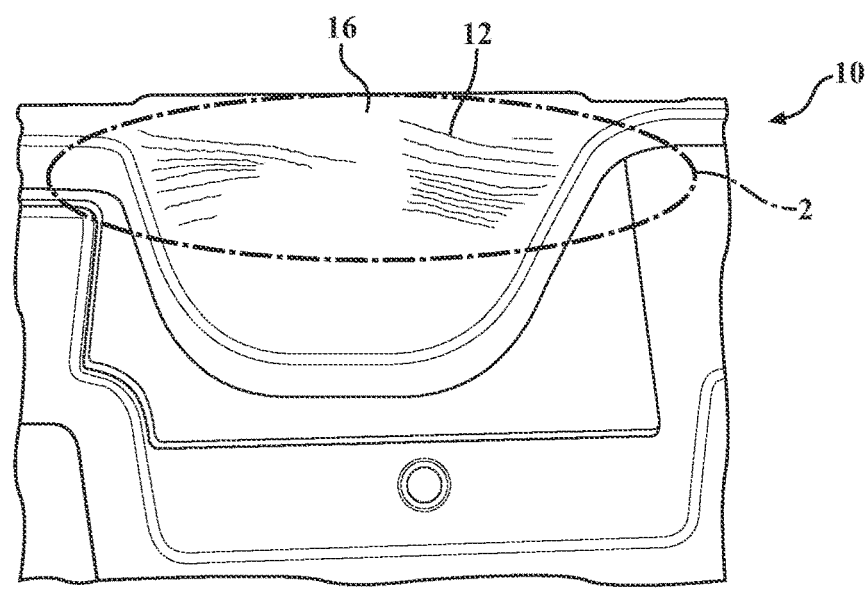
FIG. 3

FIG. 6
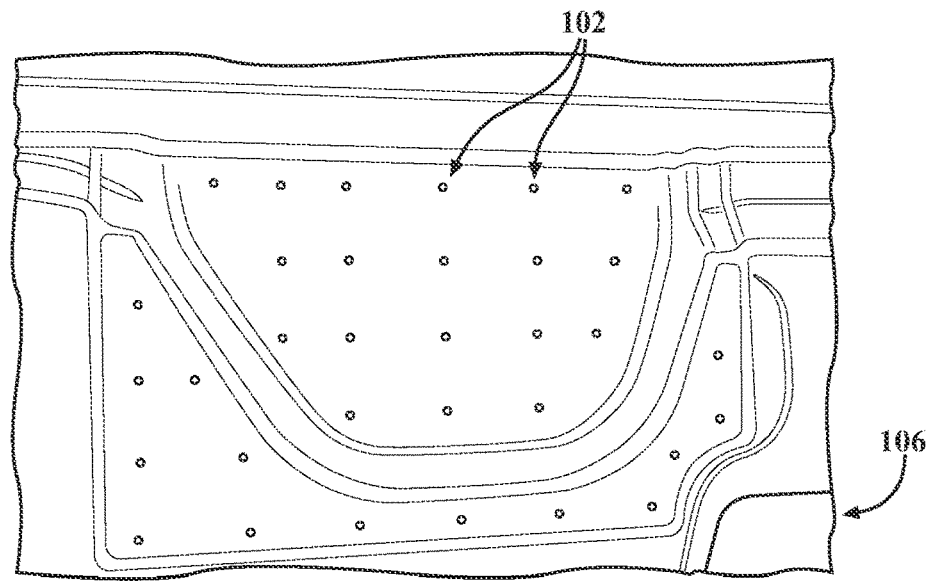
FIG. 7
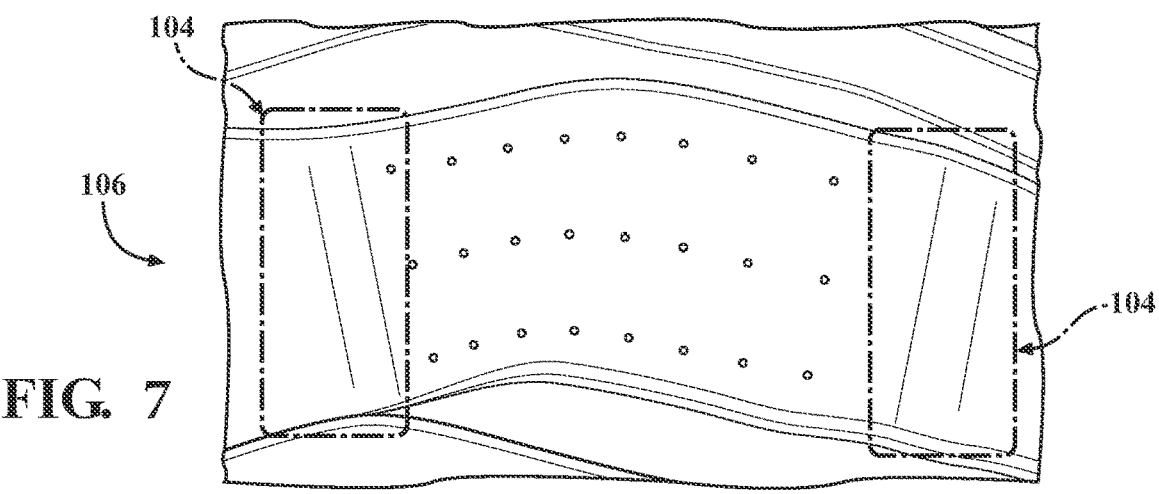
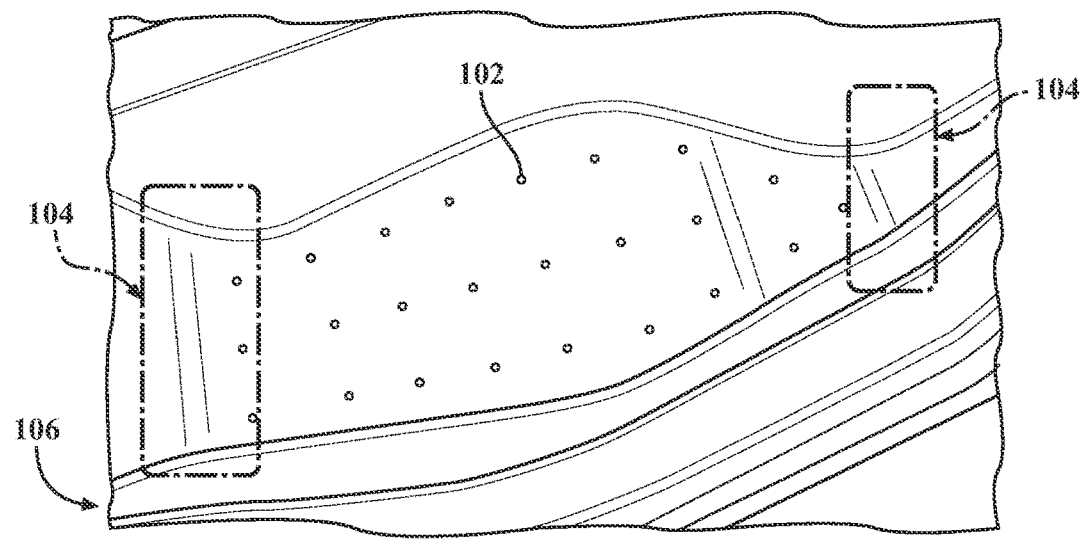
FIG. 8

CO-MOLDING OF NON-CRIMPED FABRIC AND SMC

CROSS-REFERENCE TO RELATED APPLICATIONS

This application claims the benefit of U.S. Provisional Application No. 62/960,568, filed Jan. 13, 2020. The disclosures of the above application are incorporated herein by reference.

FIELD OF THE INVENTION

The present invention relates to a method of manufacturing parts, in particular motor vehicle parts, incorporating co-molding of non-crimped fabric (NCF) and sheet molding compound (SMC).

BACKGROUND OF THE INVENTION

Non-crimped fabric is difficult to place in a compression tool and moves as a result of material flow during the compression molding process. Also, non-crimped fabric gets distorted or torn apart due to the flow of the SMC and thereby providing limited structural benefit to the laminate.

It is therefore desired to provide a method for manufacturing a part that includes steps to more easily locate and place non-crimped fabric, and to stop or minimize its movement during the compression molding process. In addition, to prevent the distortion of the continuous fiber in the fabric due to the flow of sheet molding compound during compression molding.

SUMMARY OF THE INVENTION

A method for manufacturing a part, in particular, a vehicle part, that includes steps to more easily locate and place non-crimped fabric, and to stop or minimize its movement during the compression molding process. In addition, to prevent the distortion of the continuous fiber in the fabric due to the flow of sheet molding compound during compression molding.

According to an aspect of the present invention, there is provided a method for manufacturing vehicle parts incorporating co-molding of SMC, structural SMC and continuous fiber pre-preg.

In accordance with an aspect of the present invention, the drying of the pre-preg (resin impregnated non crimped fabric, NCF) stiffens up the pre-preg thereby limiting the movement and distortion of the fabric. Pre-forming of the pre-preg allows the pre-preg to retain its shape during molding. The thorn, or other predetermined feature(s) in the tool keeps the pre-preg locked in position during molding and does not allow the flow of the SMC to move the pre-preg.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a top plane view of a first area of an exemplary SMC molded part;

FIG. 2 is a side elevation view of the second area of the part depicting undesirable NCF movement to a shear edge of the part;

FIG. 3 is a top plane view of a third area of the exemplary molded part depicting undesirable NCF movement;

FIG. 6 is a top plane view of a first area of exemplary tooling with a plurality of thorns, in accordance with aspects of the present invention;

FIG. 7 is a top plane view of a second area of exemplary tooling with a plurality of thorns and a plurality of ramps, in accordance with aspects of the present invention;

FIG. 8 is a top plane view of a second area of exemplary tooling with a plurality of thorns and a plurality of ramps, in accordance with aspects of the present invention;

DETAILED DESCRIPTION OF THE PREFERRED EMBODIMENTS

The following description of the preferred embodiment(s) is merely exemplary in nature and is in no way intended to limit the invention, its application, or uses.

The present invention allows for more easily locating and placing non-crimped fabric (NCF) and stopping or minimize its movement during compression molding processing. In addition, to prevent the distortion of the continuous fiber in the non-crimped fabric that would be caused by the flow of sheet molding compound (SMC) during compression molding.

It is known that NCF are difficult to place in compression tools and tend to move as a result of material flow during the compression molding process. Also, non-crimped fabric become distorted or torn apart due to the flow of the SMC and thereby providing limited structural benefit to the laminate.

Some of these exemplary issues are depicted in FIGS. 1 through 5.

Figure 4:
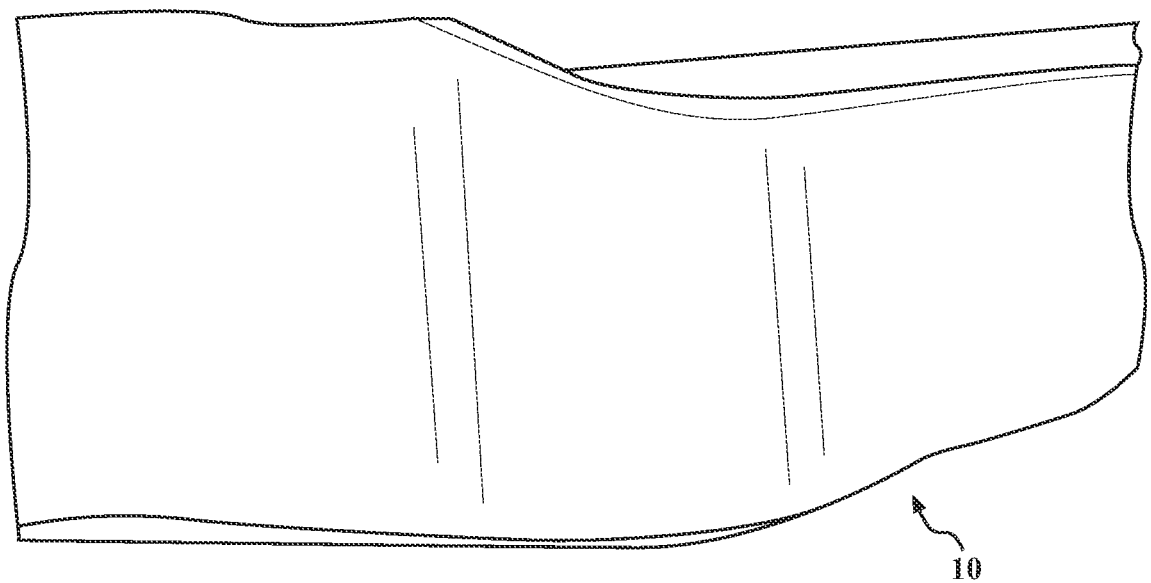
FIG. 4 is a top plane view of a third area of the exemplary SMC molded part.
Figure 5:
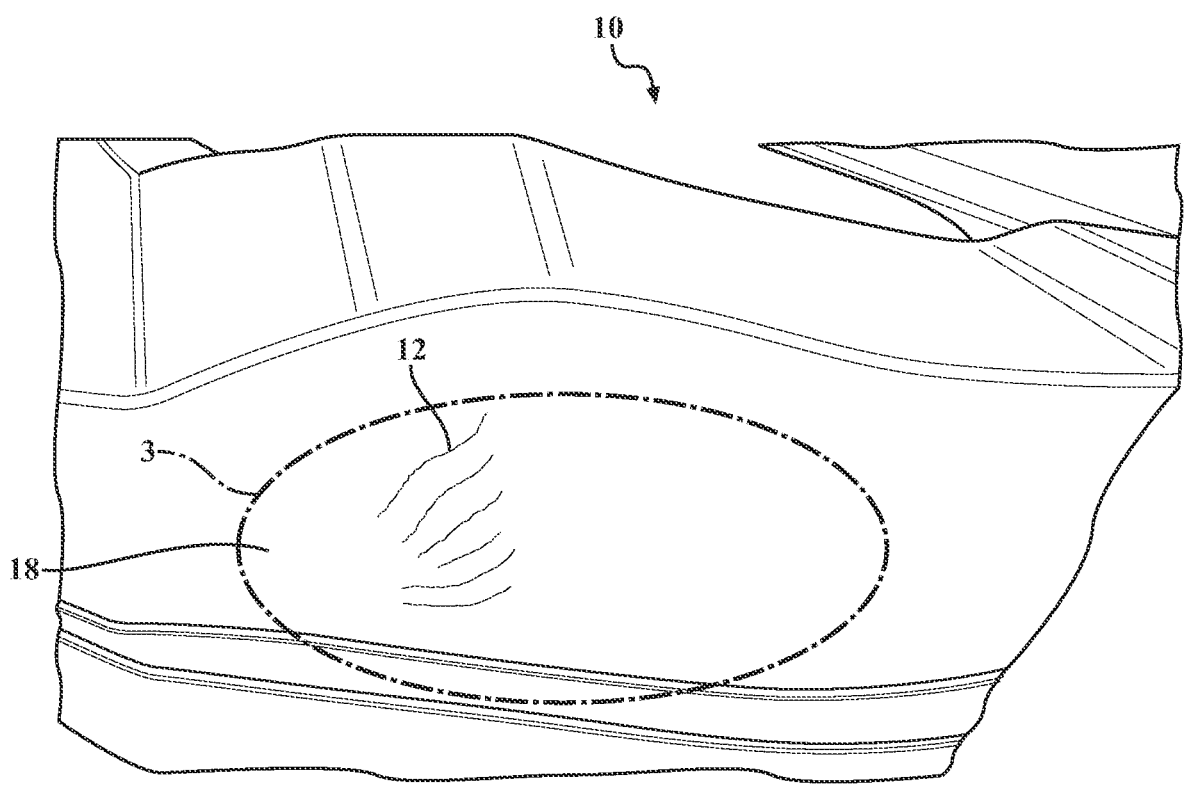
FIG. 5 is a side elevation view of the third area of the part depicting undesirable NCF movement to a shear edge of the part.

Referring generally to FIGS. 1-5, there is depicted an exemplary molded part incorporating NCF and SMC to illustrate undesirable NCF movement. By way of example, the molding cycle time is about 15 to 20 minutes at about 140 to 145° C. By way of another example, the molding cycle time is about 5 minutes at about 140 to 145° C. In trials, a shaped charge pattern was used to minimize flow within the molding process. The results showed NCF issues. In particular, NCF movement was seen in a plurality of areas. The NCF moved into the shear edge during molding at each area. FIG. 1 depicts a top plane view of the driver's side (left side; first area 1) of the part indicated generally at 10 (e.g., instrument panel, or any other molded component). As can be seen in FIG. 2, a side elevation view of the driver's side of the part 10, the NCF 12, indicated at 12, moved into the shear edge 14 during molding of the area. FIG. 3 depicts a top plan view of the roll restrictor (center; second area 2) of the part depicted undesirable NCF 12 movement toward the edge 16 during molding of the area. FIG. 4 depicts a top plane view of the passenger's side (right side; third area 3) of the part 10. As can be seen in FIG. 5, a side elevation view of the passenger's side of the part 10, the NCF 12 moved into the shear edge 18 during molding of the area (e.g., slid down the vertical wall of the part 10 on the passenger side). Therefore, it was still desired to find a way for the NCF to stay on the horizontal face and vertical wall, while not sliding down the vertical wall, or any other predetermined areas, face, surfaces, walls, etc. of a predetermined part.

Referring now to FIGS. 6-8 and 13-18 generally, in accordance with the present invention, there is provided a method for manufacturing a part. In particular, a method suitably adapted to manufacture any vehicle part (e.g., automotive hood, roof, trunk, door, liftgate, instrument panel, tailgate, floor console, etc. or any panel or any other part). The method includes steps to more easily locate and place NCF, and to stop or minimize the NCFs movement during the compression molding. In addition, to prevent the distortion of the continuous fiber in the fabric due to the flow of SMC during compression molding.

The steps of the present invention include: Drying of the pre-preg to achieve suitable stiffness for molding; Preforming of the pre-preg; and Providing thorns in the tool to prevent movement of pre-preg during molding.

There is first provided a plurality of predetermined materials. At least a first material is provided suitable for compression molding. Preferably, at least one first material is an SMC. Most preferably, a carbon fiber SMC. At least a second second material is provided. Preferably, at least one second material is a non-crimped fabric. Preferably, at least a third material is provided. More preferably, at least a third material is provided that is a resin, most preferably, an epoxy resin.

Predetermined tooling is also provided, in accordance with the present invention, with features to prevent movement, most preferably, the features being at least a plurality of thorns in the tool (and/or other predetermined positive locating feature(s), ramps, etc.) are provided to prevent movement of pre-preg during molding, e.g., compression molding.

FIG. 6-8 depict tooling that minimizes NCF movement, in accordance with aspects of the present invention.

Referring more particularly to FIGS. 6-8 providing operable tooling is incorporated in the method for manufacturing a part. There is depicted in FIGS. 6-8 exemplary tooling with areas (e.g., areas corresponding to the driver's side, center, and passenger side) each with a plurality of thorns 102, in accordance with aspects of the present invention. The addition of the thorns 102 assists to keep the NCF stable and prevent or limit NCF movement. Preferably, the thorns 106 are located in the tool face to prevent movement of NCF. Most preferably, thorns 106 are provided only to the main upper tooling. The plurality of thorns 106 are operably spaced, preferably in a predetermined pattern (e.g., substantially an array of columns and rows). Preferably, a plurality of ramps (shown generally at 104, dotted line areas in FIGS. 7 and 8) are also added to tooling 106, in accordance with aspects of the present invention. The addition of the ramps 104 is suitable to NCF locations. Preferably, the ramps 104 added to the tooling 106 are operable to allow the addition of a ply drop design for the NCF patch to locate. Preferably, the NCF patch(es) size and shape on the main upper tooling substantially match respective ramps 104, e.g., or the substantially the spans between ramps. It is understood that a plurality of thorns 102 at predetermined locations and predetermined quantity and patterns depending on the particular application are provided on the tooling 106. It is further understood that, optionally, a plurality of ramps 104 at predetermined locations and predetermined shapes depending on the particular application are provided on the tooling 106. Preferably, a combination of a plurality of thorns 102 and a plurality of ramps 104 are incorporated with the tooling 106 and adapted depending on the particular application suitable for manufacturing various parts. Preferably, the NCF patch(es) create a decreasing size gradient (e.g., with largest to smallest, where the largest touches the tool face. Optionally, stitch bond patches are stacked from largest to smallest).

As a result of the inventive combination of thorns 102 and ramps 104 and pre-formed pre-preg, as set forth further below, the NCF has very minimal movement during molding, if any at all, and completely covers the location and fits ramps accordingly. In other words, the NCF provides full coverage over the required respective area.

Figure 9:
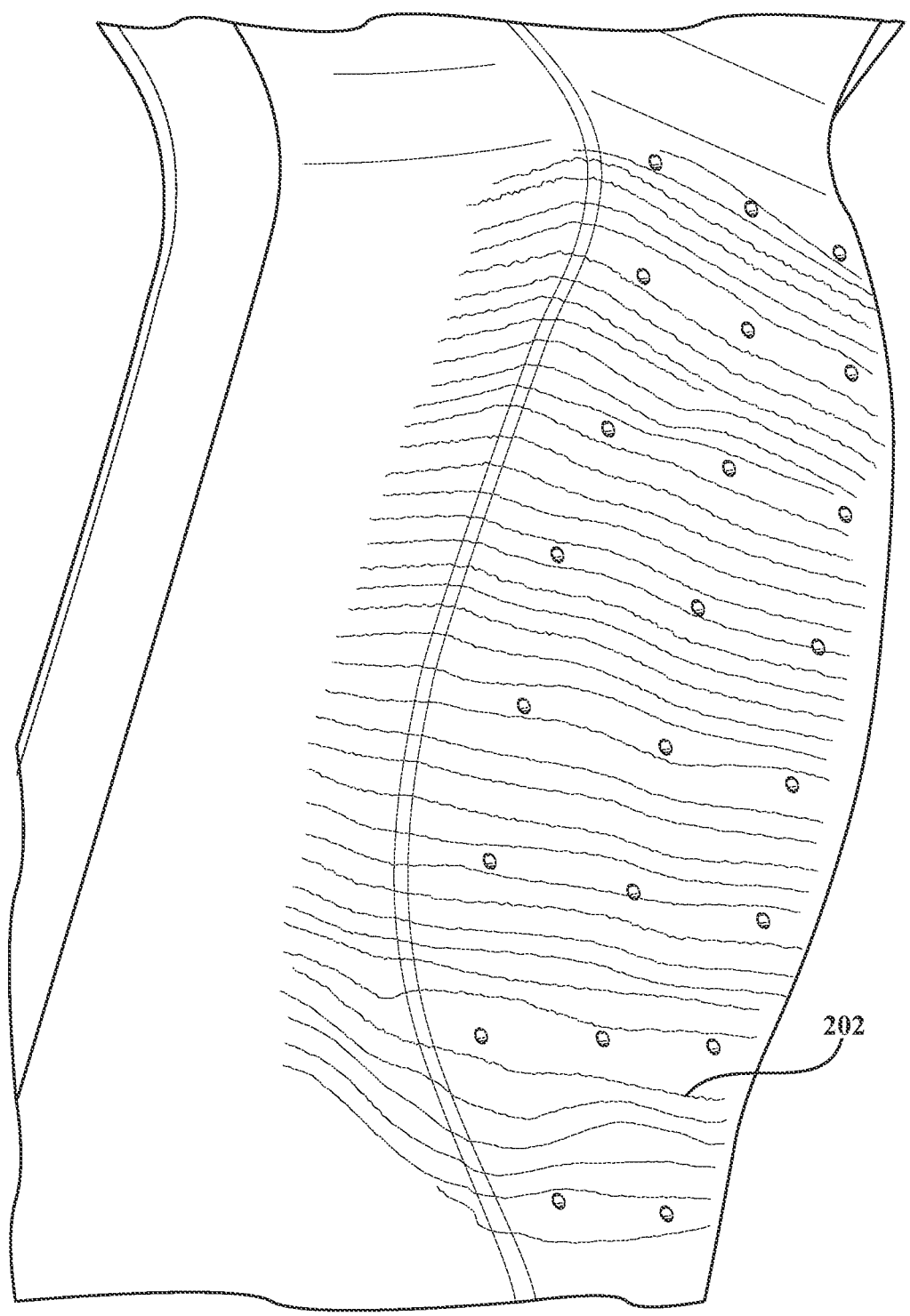
FIG. 9 is a perspective view depicting an exemplary molded part with NCF movement without the preforming and drying of the NCF.

FIG. 9 depicts an exemplary part 200 illustrating NCF 202 movement. While improved with the plurality of thorns 102, the NCF still showed some movement in trials. The trial stich bond patches moved out of position on both upper and lower in initial molding trials. However, it was then determined that pre-forming and drying of patches prior to molding resolved the lower panel issues and improved or resolved the upper panel—NCF coverage and movement. In addition, thorn 102 features were added to the upper panel mold to more positively secure NCF patches in place. Molding trials subsequent to the tool modifications confirmed that thorn 102 features in combination with pre-forming and drying patches corrected the NCF patch movement issue in the molded panel.

Figure 10:
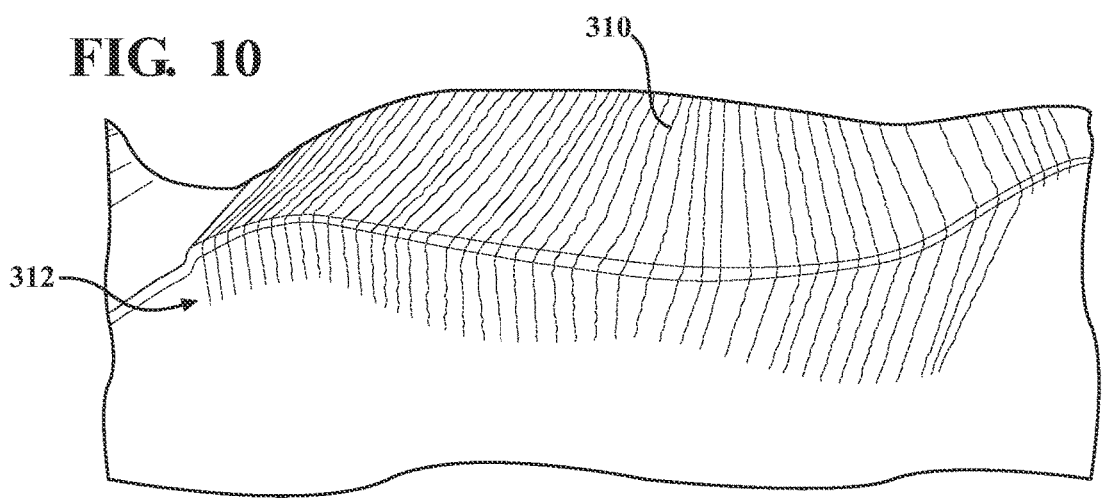
FIG. 10 is a perspective view of a first area of an exemplary molded part depicting a lack of desirable NCF coverage.
Figure 11:
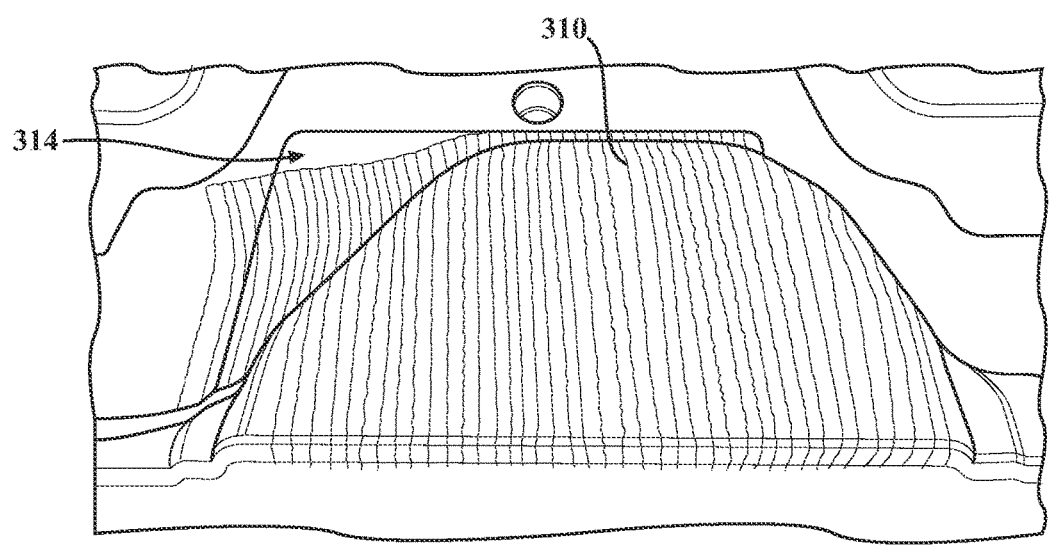
FIG. 11 is a perspective view of a second area of an exemplary molded part depicting a lack of desirable NCF coverage.
Figure 12:
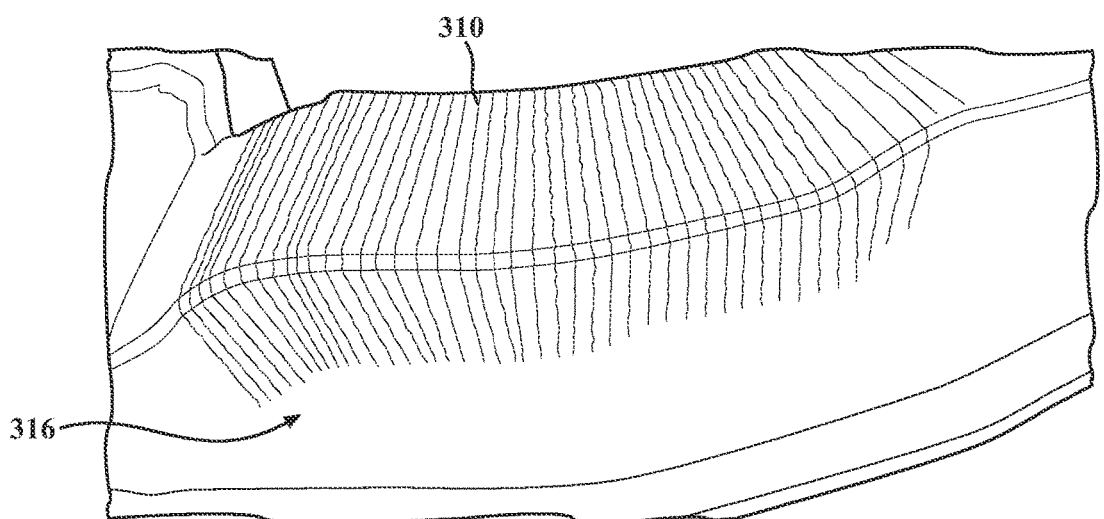
FIG. 12 is a perspective view of a third area of an exemplary molded part depicting a lack of desirable NCF coverage.

FIGS. 10-12 illustrates NCF 310 undergoing movement in areas (e.g., driver's side—FIG. 10, center—FIG. 11, and passenger's side—FIG. 12) during molding trials because the patches of NCF were too small and do not provide enough coverage, resulting in the NCF 310 not providing full coverage of the targeted area and undergoing movement. Various exemplary areas of lack of coverage of NCF and movement are indicated generally at 312, 314, and 316, respectively.

In accordance with the present invention, an initial step of manufacturing of the part includes drying of a pre-preg to achieve suitable stiffness for molding, e.g., suitable for compression molding. One of the steps that follows is the pre-forming of the pre-preg.

In accordance with an aspect of the present invention, the drying of the pre-preg (resin impregnated non-crimped fabric) stiffens up the pre-preg thereby limiting the movement and distortion of the fabric when a flow of material, e.g., SMC, is delivered in molding of the part. In a non-limiting example, the non-crimped fabric is reduced in size a predetermined amount from the original size, (e.g., generally, reduced by at least about 1 to 50 percent, typically reduced by at least about 2 to 25 percent, preferably reduced by about 1 to 15 percent, most preferably reduced by about 2 to 10 percent relative to the original size) when exposed to elevated temperatures (e.g., generally about 60-100 degrees C., typically about 70-90 degrees C., preferably about 80 degrees C.) in an oven, for a predetermined period of time (e.g., generally about 1 to 2 hours, typically about 1.25 to 1.75 hours, preferably about 1.5 hours). This allows the material to "dry out" (off-gas) predetermined content, such as a predetermined weight percentage of styrene content. The dried non-crimped fabric will resist SMC flow better during molding. One benefit is less slip along the edge(s) of the tool and the fiber alignment is closer to the desired orientation. In accordance with aspects of the present invention, the range is generally at least about 40 to 120 degrees C., typically at least about 60-100 degrees C., preferably at least about 70-90 degrees C., most preferably, at least about 80 degrees C. In accordance with aspects of the present invention, the range is generally at least about 0.5-3 hours, typically at least about 1 to 2 hours, preferably at least about 1.25 to 1.75 hours, most preferably at least about 1.5 hours. More or less time and higher or low temperature are contemplated depending on the application without departure from the scope of the present invention.

Optionally, a plurality of ramps is added to molding tool to allow addition of a ply drop design for the NCF patches. In accordance with an aspect of the present invention, a predetermined stack-up pattern is contemplated depending on the application without departure from the scope of the present invention (e.g., stack, wrap, strips, tubes, cut sections, profile sections, patch(es), stich bond patches, etc. and any combinations thereof.

Figure 13:
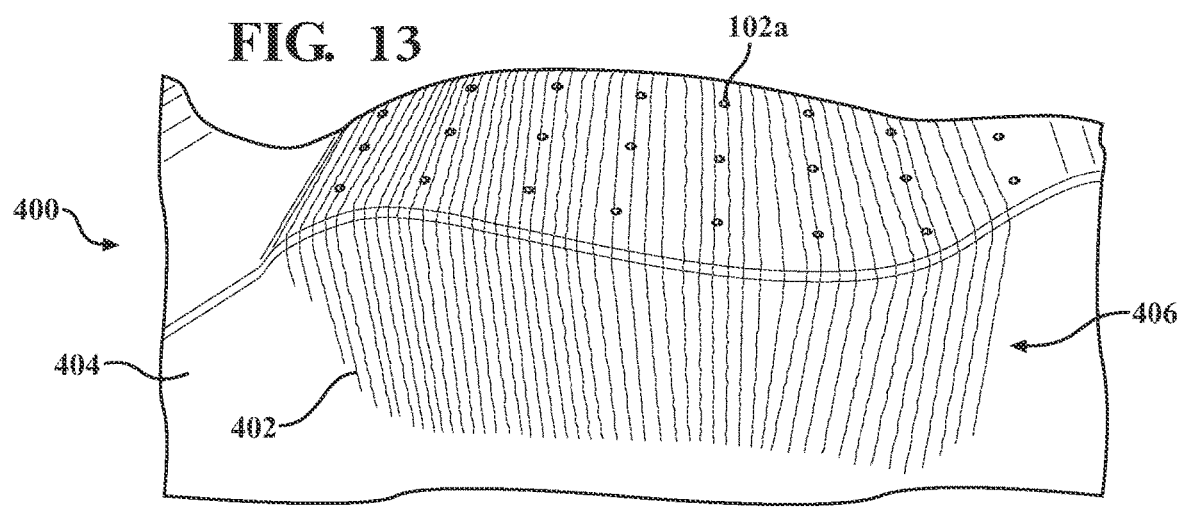
FIG. 13 is a perspective view of a first area of an exemplary molded part depicting exemplary desirable NCF coverage resulting from dried and pre-formed NCF and tooling thorns, in accordance with aspects of the present invention.
Figure 14:
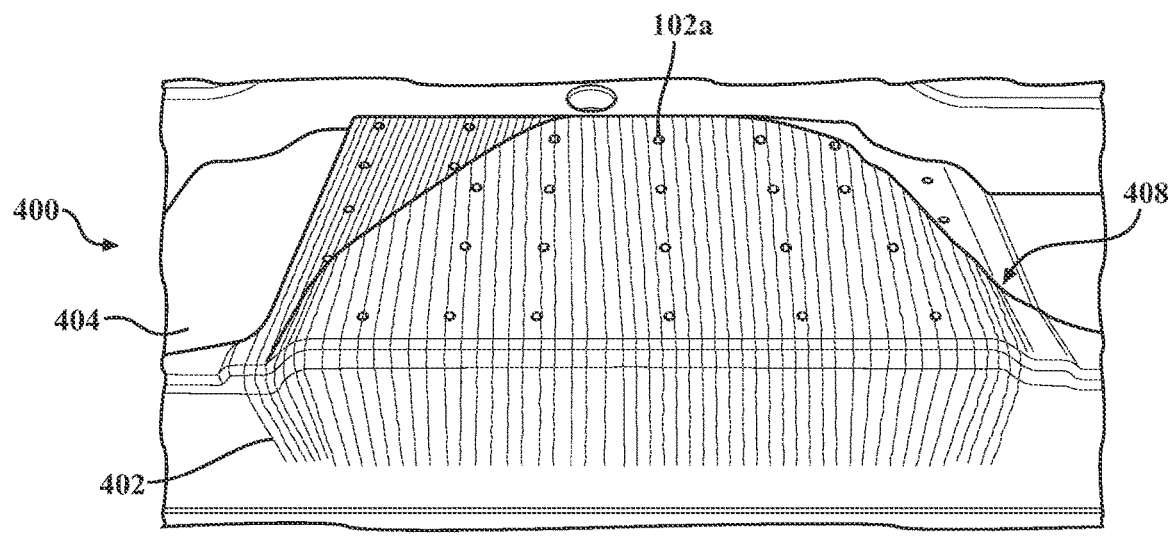
FIG. 14 is a perspective view of a second area of an exemplary molded part depicting a lack of desirable NCF coverage resulting from dried and pre-formed NCF and tooling thorns, in accordance with aspects of the present invention.
Figure 15:
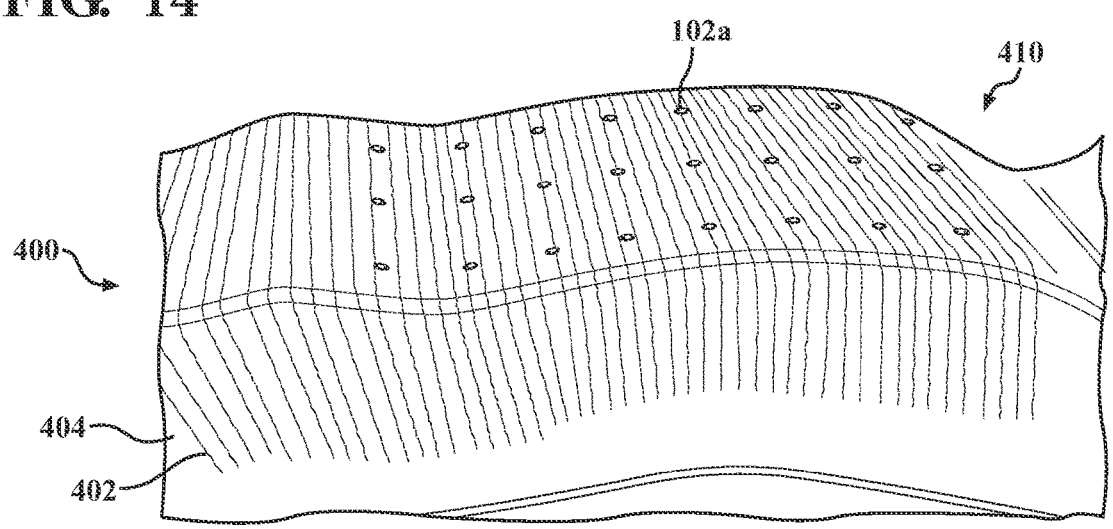
FIG. 15 is a perspective view of a third area of an exemplary molded part depicting exemplary desirable NCF coverage resulting from dried and pre-formed NCF and tooling thorns, in accordance with aspects of the present invention.

Referring now to FIGS. 13-15 generally, there is depicted an exemplary part shown generally at 400 depicting exemplary coverage of NCF 402 where NCF 402 has very minimal movement during molding and the NCF 402 completely covers the location and fits the ramps. Areas of the SMC 404 compression molded exemplary part are depicted (e.g., driver's side—FIG. 13, center—FIG. 14, and passenger's side—FIG. 15) with various exemplary areas of having preferred NCF full coverage of NCF and minimal to no movement of the NCF, as indicated generally at areas 406, 408, and 410, respectively. Exemplary fiber alignment in the NCF 402 is illustrated. Shallow indentations or 102a may be left from the thorns 102, however, it is understood that, alternatively, the thorns 102 are operably adjusted in shape, pressure or during molding to render a substantially smooth part surface substantially void of any impressions from the thorns 102.

In a step of the present invention, pre-forming of the pre-preg allows the pre-preg to retain its shape during molding, e.g., compression molding.

It was noticed in trials that the pre-form tools degrade throughout the drying process. But degrading was observed only where NCF and plastic contacted. Styrene was causing degradation of the plastic. Coating preforms in paint did not improve the condition.

In accordance with an aspect of the present invention, pre-form tools, preferably, that are three dimensional (3D) printed, are provided. A step of coating the pre-form tools in at least one layer of resin, most preferably an epoxy resin, prevents NCF to plastic contact (or plastic/paint to NCF contact), in accordance with an aspect of the present invention. This was a significant improvement over no-coating or paint. Most preferably, the pre-form is coated in at least two layers of resin, preferably epoxy resin.

Figure 16:
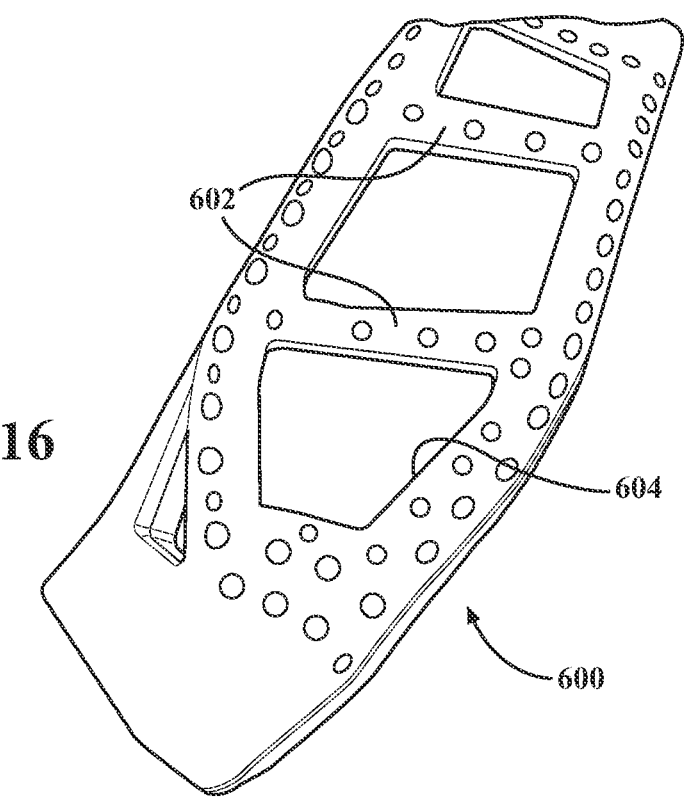
FIG. 16 is a top perspective view of an exemplary pre-form tool, in accordance with aspects of the present invention.
Figure 17:
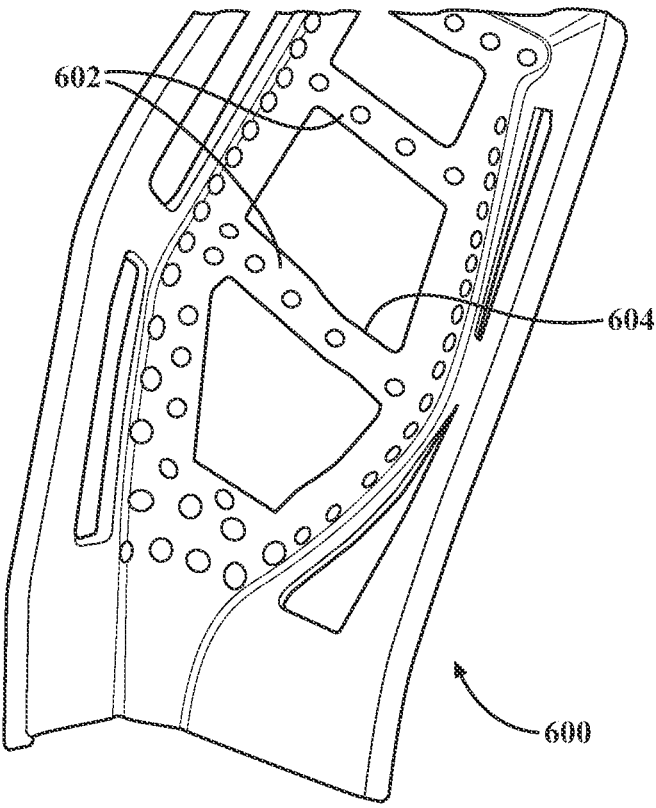
FIG. 17 is a bottom perspective view of the exemplary pre-form tool of FIG. 16, in accordance with aspects of the present invention.

In accordance with aspects of the present invention, the pre-form tools include a plurality of large sections removed with bridges remaining to support the shape of the NCF. This helps to further improve the drying process and time and further helps reduce the contact of plastic for potential degradation of the NCF. Referring generally to FIGS. 16 and 17, there is depicted an exemplary pre-form tool 600 with bridges of material 602 bounding a plurality of openings 604. The pre-form shapes and sizes and configurations (e.g., to generate a 3D weaved material) are operably adaptable depending on the applications without departure from the scope of the present invention for the manufacture of parts. Placing a predetermined material, e.g., such as steel mesh, between pre-form tools and NCF to increase air flow for increasing drying is contemplated without departure from the scope of the present invention. Increasing surface area to increase drying is also contemplated without departure from the scope of the present invention.

In accordance with another aspect of the present invention, the NCF pre-form tool is alternatively a substantially solid piece with a plurality of holes therethrough for NCF pre-form drying, etc. In accordance with another aspect of the present invention, the NCF pre-form tool is alternatively a substantially solid piece with a substantially honeycomb aperture pattern for pre-form drying, etc. The pre-form tooling design and quantity is adaptable for any manufactured part. It is understood that any alternative shape of the pre-form tooling and aperture locations and sizes and shapes are contemplated depending on the particular application without departure from the scope of the present invention. 3D printing the pre-form tools is preferred.

Non-crimped fabric (NCF) is described throughout, however, it is understood that alternatives, e.g., such as woven fabric, are also contemplated depending on the application without departure from the scope of the present invention. The present invention is further adoptable with all reinforcement glass, carbon aramid, and any other suitable materials, etc., and combinations thereof.

Figure 18:
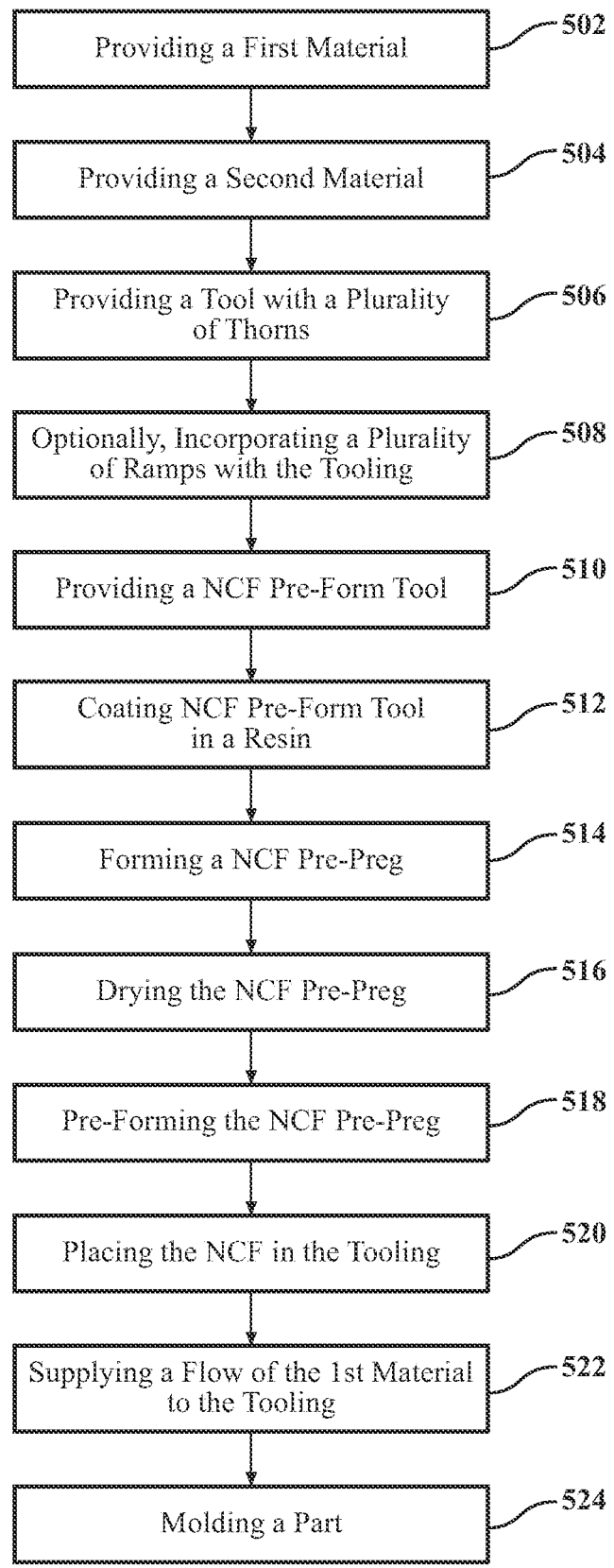
FIG. 18 is a flow chart depicting a method for manufacturing parts.

Referring now to FIG. 18 generally, there is depicted a flow chart for manufacturing parts indicated generally at 500, in accordance with the present invention, which incorporates co-molding a plurality of materials, preferably, co-molding of at least one first material and second material. Providing at least one first material is shown at step 502. The first material is preferably an SMC (a carbon fiber or other reinforced material SMC is contemplated depending on the application without departure from the scope of the present invention). Providing at least one second material is shown at step 504. The second material is preferably an NCF material (e.g., carbon fiber NCF, or any material suitable for strength, etc.). Providing at least one tool with a plurality of thorns is shown at step 506. Thorns help prevent NCF movement during molding. Optionally, incorporating a plurality of ramps with the tooling is shown at step 508. The tool is a molding tool, most preferably, compression molding. Providing at least one pre-form tool is shown at step 510. The pre-form tool is preferably an NCF pre-forming tool. By non-limiting example, the pre-form tools are created using glass fiber and resin inside of a vacuum. Coating the pre-form tool with at least one layer of predetermined material is shown at step 512. The coating is typically a resin, most preferably, an epoxy resin. More preferably, the pre-form tool is double coated, most preferably, double coated with epoxy resin. Forming or shaping the NCF pre-preg in the pre-form tool is shown at step 514. By way of non-limiting example, the NCF is impregnated or coated with a resin or any other predetermined material, e.g., while in the pre-form tool, or alternatively, prior. Next, drying of the NCF pre-preg is shown at 516. The drying is done for a predetermined amount of time at a predetermined temperature, preferably such as time and temperature detailed previously. Typically, drying is in an oven. The drying of the pre-preg (e.g., resin impregnated NCF) stiffens up the pre-preg thereby limiting the movement and distortion of the fabric. Thus, dried NCF best resists the flow of SMC during molding. Optionally, any further pre-forming of the pre-preg is indicated at step 518. It is understood that, alternatively, the drying of the pre-preg, step 516, may be done prior to pre-forming at step 514. At least one piece of the pre-formed NCF is then aligned with the tooling or molding. Preferably, a plurality of NCFs is used in predetermined areas. Placing the NCF in the predetermined area(s) of the tooling is indicated at step 520. Loading is manual, or more preferably, automated. Supplying a flow of at least the first material to the tooling is indicated at step 522. Preferably, the material is an SMC. Alternatively, a carbon fiber SMC. It is contemplated that more than one material can be used depending on the application without departure from the present invention. As the material flow is applied, the operably dried NCF in combination with at least the plurality tooling thorns 102 resists movement from the flow of the first material in the tool. Molding the part in the tooling, e.g., compression molding, is indicated at step 524. Pre-forming of the pre-preg allows the pre-preg to retain its shape during molding. The thorns 102, or other predetermined feature(s), stand-off features, protrusions, and/or e.g., ramps, 104, in the tool 106 keeps the pre-preg locked in position during molding and does not allow the flow of the SMC to move the pre-preg. The result is full coverage of NCF in the desired predetermined area(s) of the manufactured part, e.g., automotive panel.

According to an aspect of the present invention, there is provided a method for manufacturing vehicle parts incorporating co-molding of Class A SMC, structural SMC and continuous fiber pre-preg. According to an aspect of the present invention, there is provided a method for manufacturing vehicle parts incorporating co-molding of Class A SMC, structural SMC and continuous fiber pre-preg, wherein the method includes incorporating predetermined suitable materials in combination with predetermined features and steps to effectively produce a part with predetermined properties and cost and manufacturing benefits. By way of non-limiting example of an aspect of the present invention, the combination of materials, structural and other features and manufacturing steps provide for the cost-effective production of a part, e.g., vehicle part, one-piece, compression-molded automotive hood, etc. e.g., a combination of a plurality of predetermined molding materials (e.g., at least three predetermined molding materials) and the incorporation of predetermined features (e.g., ribs, flanges, corrugations, etc) has significant advantages, e.g., eliminates the need for inner reinforcement panels (or reinforcement brackets, etc), significantly reduces tooling costs, simplifies the manufacturing process, is more easily manufactured, significantly reduces weight, produces lightweight composite parts, etc.

Non-crimped fabric (NCF) is described however, it is understood that woven fabric or any other suitable fabric material is contemplated and incorporated into the present invention depending on the application without departure from the scope of the present invention. The present invention is applicable to all reinforcement glass, carbon aramid, etc. or any other suitable material and combinations thereof is contemplated depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of manufacturing an automotive panel, comprising:
    providing at least a first material;
    providing at least one molding tool with a plurality of thorns in at least one predetermined area of said molding tool;
    providing at least one second material including a predetermined non-crimped fabric;
    providing at least one pre-forming tool;
    coating an entire loading surface of said pre-forming tool in at least one layer of resin before loading said non-crimped fabric to said pre-forming tool;
    pre-forming each of said at least one predetermined non-crimped fabric in said at least one pre-forming tool, respectively, forming at least one non-crimped fabric pre-preg;
    drying the at least one non-crimped fabric pre-preg a predetermined amount to achieve operable predetermined stiffness to limit the movement and distortion of the at least one non-crimped fabric pre-preg during molding of the automotive panel;
    loading said at least one non-crimped fabric pre-preg that is dried into said molding tool against said respective plurality of thorns; and
    supplying a flow of said at least one first material to said molding tool and molding said automotive panel, wherein said plurality of thorns further prevents movement of said at least one non-crimped fabric pre-preg during said flow of said at least one first material.

2. The method of manufacturing an automotive panel of claim 1, wherein said at least one first material includes a sheet molding compound.

3. The method of manufacturing an automotive panel of claim 1, wherein loading said at least one non-crimped fabric pre-preg that was dried incorporates placement along at least one edge in said molding tool, and wherein said stiffness of the dried non-crimped fabric allows less slip along said at least one edge and maintains individual fiber alignment and orientation during said flow of said at least one first material and molding.

4. The method of manufacturing an automotive panel of claim 1, wherein molding is compression molding.

5. The method of manufacturing an automotive panel of claim 1, wherein the molding tool comprises at least one main upper tool and at least one lower tool for compression molding, said plurality of thorns located on the main upper tool in a predetermined array pattern.

6. The method of manufacturing an automotive panel of claim 1, further comprising providing at least one ramp in the molding tool, said at least one non-crimped fabric pre-preg that was dried substantially stays in place during molding, providing predetermined full coverage of the predetermined area adjacent to said at least one ramp.

7. The method of manufacturing an automotive panel of claim 1, further comprising forming at least two ramps on the molding tool, wherein said at least one non-crimped fabric pre-preg that was dried substantially covers the spans between the at least two ramps in the automotive panel after molding.

8. The method of manufacturing an automotive panel of claim 1, further comprising providing a plurality of ramps in the molding tool, wherein said at least one non-crimped fabric pre-preg that was dried a predetermined amount in combination with the plurality of thorns substantially maintains the location of each of said at least one non-crimped fabric pre-preg relative to respective said plurality of ramps throughout the flow of said first material and molding, which location is substantially between each adjacent pair of said plurality of ramps.

9. The method of manufacturing an automotive panel of claim 1, wherein said drying is performed at about 60-100 degrees C. and/or wherein said drying is performed at about 1 to 2 hours.

10. The method of manufacturing an automotive panel of claim 1, wherein said drying reduces said at least one non-crimped fabric pre-preg size a predetermined amount from an original size.

11. The method of manufacturing an automotive panel of claim 1, wherein said drying allows material to dry out predetermined content, including a predetermined weight percentage of styrene content.

12. The method of manufacturing an automotive panel of claim 1, wherein said pre-forming tool includes a plurality of apertures to improve drying efficiency of the at least one non-crimped fabric pre-preg.

13. The method of manufacturing an automotive panel of claim 1, wherein the plurality of thorns is located in at least one tool face of the molding tool.

14. The method of manufacturing an automotive panel of claim 1, wherein the plurality of thorns is located in plurality of predetermined areas on a tool face of a main upper tool only of the molding tool.

* * * * *